United States Patent
Jiao et al.

(10) Patent No.: US 7,609,585 B2
(45) Date of Patent: Oct. 27, 2009

(54) METHOD FOR SUB-SALT MIGRATION VELOCITY ANALYSIS

(75) Inventors: Junru Jiao, Katy, TX (US); David Richard Lowrey, Houston, TX (US); John Frier Willis, Houston, TX (US); Daniel Solano, Spring, TX (US)

(73) Assignee: PGS Geophysical AS, Lysaker (NO)

( * ) Notice: Subject to any disclaimer, the term of this patent is extended or adjusted under 35 U.S.C. 154(b) by 380 days.

(21) Appl. No.: 11/495,445

(22) Filed: Jul. 28, 2006

(65) Prior Publication Data
US 2007/0263487 A1  Nov. 15, 2007

Related U.S. Application Data

(63) Continuation-in-part of application No. 11/434,440, filed on May 15, 2006, now abandoned.

(51) Int. Cl.
*G01V 1/00* (2006.01)
(52) U.S. Cl. .......................................... 367/50; 367/73
(58) Field of Classification Search ............. 367/50–53, 367/73
See application file for complete search history.

(56) References Cited

U.S. PATENT DOCUMENTS

| | | | | |
|---|---|---|---|---|
| 5,307,268 A | * | 4/1994 | Wang et al. | 702/16 |
| 6,044,040 A | * | 3/2000 | Holland | 367/56 |
| 6,128,580 A | * | 10/2000 | Thomsen | 702/18 |
| 6,763,305 B2 | * | 7/2004 | Bernitsas | 702/14 |
| 6,904,368 B2 | * | 6/2005 | Reshef et al. | 702/17 |
| 7,065,004 B2 | * | 6/2006 | Jiao et al. | 367/51 |
| 7,085,195 B2 | * | 8/2006 | Taner et al. | 367/50 |
| 2003/0141067 A1 | * | 7/2003 | Rouffignac et al. | 166/302 |
| 2005/0237857 A1 | | 10/2005 | Jiao et al. | |
| 2007/0021951 A1 | * | 1/2007 | Lee Seislink | 703/10 |

FOREIGN PATENT DOCUMENTS

| | | |
|---|---|---|
| GB | 2 412 284 | 10/2005 |
| WO | WO 2006/041748 | 4/2006 |

OTHER PUBLICATIONS

Flyer from Paradigm. Earth Domain Imaging. www.paradigmgeo.com. 2003.*
Hubrai et al. A unified approach to 3-D seismic reflecting imaging. Part I: Basic Concepts. Geophysics, vol. 1, No. 3. (May-Jun. 1996). pp. 742-758.*

(Continued)

*Primary Examiner*—Mark Hellner
(74) *Attorney, Agent, or Firm*—E. Eugene Thigpen; Richard A. Fagin

(57) ABSTRACT

A method for interpreting seismic data below a salt layer includes depth migrating the seismic data to a bottom of the salt layer. The migrating including generating an initial model of velocities below the salt layer. The initial model is scaled by a plurality of scale factors at at least one image position. At least one of the plurality of scale factors for which a depth migrated image below the salt layer is optimum is selected as the scale factor.

15 Claims, 6 Drawing Sheets

OTHER PUBLICATIONS

Long, Andrew. What is Wave Equation Pre-Stack Depth Migration? An Overview. PESAnews. Oct./Nov. 2004. pp. 32-33.*

Sava et al. Wave-Equation Migration velocity analysis by focusing diffractions and reflections. Geophysics. vol. 70, No. 3. (May-Jun. 2005). pp. U19-U27.*

K. Al-Yahya, "Velocity Analysis by iterative profile migration", Geophysics, 1989, pp. 718-729, vol. 54.

Z. Meng, N. Bleistein, K.D. Wyatt, "3-D Analytical migration velocity analysis I: Two-step velocity estimation by reflector-normal update", 69$^{th}$ Annual International Meeting, Society of Exploration Geophysicists, Expanded Abstracts (1999).

F.E. Akbar, M.K. Sen, P.L. Stoffa, "Prestack plane-wave Kirchhoff migration in laterally varying media", Geophysics, 1996, pp. 1068-1079, vol. 61.

M.C. Tanis, "Prestack Split-step Fourier Depth Migration Algorithms and Parallel Implementation on Cary T3E", The University of Texas at Austin, Ph.D. Dissertation, 1998.

N. D. Whitmore, J.D. Garing, "Interval velocity estimation using iterative prestack depth migration in the constant angle domain", The Leading Edge, 1993, pp. 757-762, vol. 12, No. 7.

S.M. Deregowski, "Common-offset migrations and velocity analysis", First Break, 1990, pp. 224-234, vol. 8, No. 6.

J. Ren, C. Gerrard, J. Mclean, M. Orlovich, "Prestack wave-equation depth migration in VTI media", The Leading Edge, 2005, pp. 618-620, vol. 24, No. 6.

B. Wang, V. Dirks, "Sub-Salt Velocity Model Update Using Wave-Equation Migration Perturbation Scans", 66$^{th}$ Annual Meeting, Eur. Assn. Geoscience Eng., 2004, C024.

* cited by examiner

METHOD FOR SUB-SALT MIGRATION VELOCITY ANALYSIS

CROSS-REFERENCE TO RELATED APPLICATIONS

This application is a continuation-in-part (CIP) of U.S. patent application Ser. No. 11/434,440 filed on May 15, 2006 now abandoned.

STATEMENT REGARDING FEDERALLY SPONSORED RESEARCH OR DEVELOPMENT

Not applicable.

BACKGROUND OF THE INVENTION

1. Field of the Invention

This invention relates generally to the field of seismic data processing. More specifically, the invention relates to methods for migrating seismic data to correct arrival times and apparent depths of reflective events, particularly when such events are disposed below a salt layer.

2. Background Art

Seismic surveying is used to determine structures of, to determine compositions of, and to determine fluid content of subsurface Earth formations, among other uses. A particular application for seismic surveying is to infer the presence of useful materials, such as petroleum, in the subsurface Earth formations. Generally, seismic surveying includes deploying an array of seismic sensors at or near the Earth's surface at selected geographic positions, and deploying one or more seismic energy sources at selected locations, also at or near the Earth's surface. The one or more seismic energy sources are actuated and seismic energy emanates from the source(s), traveling generally downwardly through the Earth's subsurface until it reaches one or more acoustic impedance boundaries in the Earth. Acoustic impedance boundaries are frequently located at boundaries between Earth formations having different composition. Seismic energy is reflected from the one or more impedance boundaries, where it then travels upwardly until being detected by one or more of the seismic sensors. Structure and composition of the Earth's subsurface is inferred from the travel time of the reflected seismic energy, from the geographic position of the source each of the sensors and from the amplitude and phase of the various frequency components of the reflected seismic energy with respect to the energy emanating from the seismic source.

Structures in the Earth's subsurface are inferred from the travel time of the seismic energy from the source, to the acoustic impedance boundaries, and back to the seismic sensors at the surface. In order to infer the depths of and the structures of the various subsurface Earth formations from reflection seismic travel times measured at the Earth's surface, it is necessary to determine the acoustic velocity of the various formations through which the seismic energy passes. Velocities of the Earth formations can vary both with respect to depth in the Earth (vertically), and with respect to geographic position (laterally). Seismic data, however, are recorded only with respect to time. Methods are known in the art for estimating velocities of the Earth formations both vertically and laterally and such methods generally rely on inferences about the travel path geometry of the seismic energy as it travels from the seismic source to the various seismic receivers deployed at or near the Earth's surface.

Migration is a process performed on seismic data in which depth estimates to one or more reflective horizons (acoustic impedance boundaries) in the Earth are made from the "two-way" travel time of seismic energy from the seismic energy source, to the reflective horizons, and back to the seismic receivers. The depth estimates of the reflective horizons are computed and are displayed with respect to geographic position. Depth estimates based on two-way travel are corrected for energy travel path differences between the various seismic energy source and receiver geographic positions that are used during seismic data acquisition. In order to correct the depth estimates for the various source and receiver positions, it is necessary to accurately estimate the velocity of seismic energy in the Earth from the Earth's surface (or the ocean bottom in marine seismic data) to each subsurface reflective horizon. Methods are known in the art for estimating velocity from two-way travel time from the seismic source to the reflective horizons and back to the seismic receivers. One such method uses two-way travel times for source and receiver arrangements which have a "common mid point" along the seismic energy travel path. Acoustic velocities of the Earth formations from the Earth's surface to a particular subsurface reflector can be estimated using the familiar Dix equation, for example. Other methods for estimating velocity are known in the art.

Some research in "prestack" migration velocity analysis began in the early 1990's. See, for example, Al-Yahya, K., *Velocity analysis by iterative profile migration*, Geophysics, vol. 54, pp. 718-729 (1989). Various analytic functions have been derived to express the relationship between the true velocity (or the ratio of the migration velocity and the true velocity) and the offset in a common image gather ("CIG") after migration. The foregoing analytic functions make use of the assumptions of a small dip (rate of change of depth with respect to lateral displacement), small offset, and/or constant velocity in the various layers of the Earth's subsurface. Residual moveout analysis has also been used to extend the application of such analytic functions to media having lateral velocity variation. See, for example, Meng, Z, Bleistein, N, and Wyatt, K. D, *3-D Analytical migration velocity analysis I: Two-step velocity estimation by reflector-normal update*, 69$^{th}$ Annual International Meeting, Society of Exploration Geophysicists, Expanded Abstracts (1999).

Most of the migration methods known in the art are implemented in the depth-offset domain, and a top-down "layer stripping" migration method is then used to derive the interval velocities. It is known in the art to use the depth-offset domain because this is the domain in which most prestack depth migration is performed, and the domain in which migrated CIG's are available for analysis. However, it is also known in the art to perform prestack depth migration in the plane-wave (τ-p) domain. See, for example, Akbar, F. E., Sen, M. K., and Stoffa, P. L, *Prestack plane-wave Kirchhoff migration in laterally varying media*, Geophysics, 61, 1068-1079 (1996). See also, Tanis, M. C., *Prestack Split-step Fourier Depth Migration Algorithms and Parallel Implementation on Cray T3E*, Ph.D. Dissertation, The University of Texas at Austin (1998). After migration in the plane wave domain, seismic data are displayed or presented in the depth-plane wave (z-p) domain. Prestack depth migration using slant stack (τ-p) data and a substantially correct interval velocity-depth model generate events in a common image gather (CIG) in the depth-plane wave (z-p) domain which are substantially horizontally aligned, because a CIG represents an image of the same subsurface position obtained along different seismic travel path angles. See, for example, Whitmore, N. D. and Garing, J. D., *Interval velocity estimation using iterative prestack depth migration in the constant angle domain*, The Leading Edge, vol. 12, no. 7, pp. 757-762 (1993).

Use of an erroneous velocity-depth model in migration, however, can cause misalignment of reflective events in a CIG, meaning that the reflective events displayed on the CIG exhibit a residual "moveout." By analyzing the residual moveout (a change in apparent depth with respect to ray parameter) in the CIG, it is possible to derive depth and velocity corrections, thus obtaining an updated velocity-depth model. For example, if the velocity used in the migration process is lower than the true velocity, the event appears to curve upwardly in the depth-plane wave (z-p) domain after prestack depth migration. If the velocity used in the migration process is higher than the true velocity, then the events in the CIG appear to curve downwardly.

For some time, a method known as the "vertical velocity update method" has been used to generate a velocity-depth model for prestack depth migration. A typical data processing procedure used in such methods is known as the "Deregowski loop." See Deregowski, S. M., *Common-offset migrations and velocity analysis*, First Break, vol. 8, no. 6, pp. 224-234 (1990). Residual velocity analysis can be applied at all depths based on the constant velocity assumption. See, Al-Yahya, K. (1989), *Velocity analysis by iterative profile migration*, Geophysics, vol. 54, pp. 718-729. Then the constant velocities are converted to interval velocities for a subsequent iteration. If it is desired to obtain the interval velocities from migrated seismic data directly, it is necessary to perform both prestack depth migration and the velocity analysis in a top-down "layer-stripping" procedure.

More recently, there has been considerable interest in determining structures and compositions of Earth formations disposed below a layer of salt in the Earth's subsurface. Salt layers present a challenge to high-quality seismic imaging, first because a salt layer disposed in typical subsurface sedimentary Earth formations is an excellent seismic energy reflector. The relatively high amplitude of salt-based seismic reflections tends to mask reflective horizons disposed below the salt layer. Second, salt layers are frequently quite variable in thickness, causing some of the assumptions used in ordinary seismic interpretation methods to be inapplicable. Such assumptions include that the Earth formations are approximately horizontally disposed and are approximately uniform thickness over a limited areal extent.

To obtain a high quality image of structures below a salt layer it is generally believed that wave equation migration produces images of sub-salt structures with higher fidelity than does Kirchhoff integral migration. See, for example, Ren, J., Gerrard, C., McClean, J. and Orlovich, M., *Prestack wave-equation depth migration in VTI media*, The Leading Edge, 24, no. 6, 618-620 (2005). However, wave equation migration requires an accurate seismic velocity model. Obtaining an accurate seismic velocity model for use in imaging sub-salt structures remains challenging. See, for example, Wang, B. and Dirks, V., 2004, *Sub-Salt Velocity Model Update Using Wave-Equation Migration Perturbation Scans*, 66th Ann. Mtg., Eur. Assn. Geosci. Eng., C024 (2004). Although reflection tomography inversion based on ray tracing is used successfully to generate high quality velocity models for migration in most sediment areas, it has proven less effective in analyzing seismic velocity below a salt layer.

There continues to be a need for improved seismic interpretation techniques for Earth formations disposed below a salt layer.

SUMMARY OF THE INVENTION

One aspect of the invention is a method for interpreting seismic data below a salt layer. A method according to this aspect of the invention includes depth migrating the seismic data to a bottom of the salt layer. The migrating includes generating an initial model of velocities below the salt layer. The initial model is scaled by a plurality of scale factors at at least one image position. At least one of the plurality of scale factors for which a depth migrated image below the salt layer is optimum is selected as the scale factor.

Another aspect of the invention is a computer program stored in a computer readable medium. A program according to this aspect of the invention includes logic operable to cause a programmable computer to perform the following steps. Seismic data are depth migrated to a bottom of the salt layer. The migrating includes generating an initial model of velocities below the salt layer. The initial model is scaled by a plurality of scale factors at at least one image position. The one of the plurality of scale factors for which a depth migrated image below the salt layer is optimum is selected as the scale factor.

Other aspects and advantages of the invention will be apparent from the following description and the appended claims.

DETAILED DESCRIPTION

Figure 1:
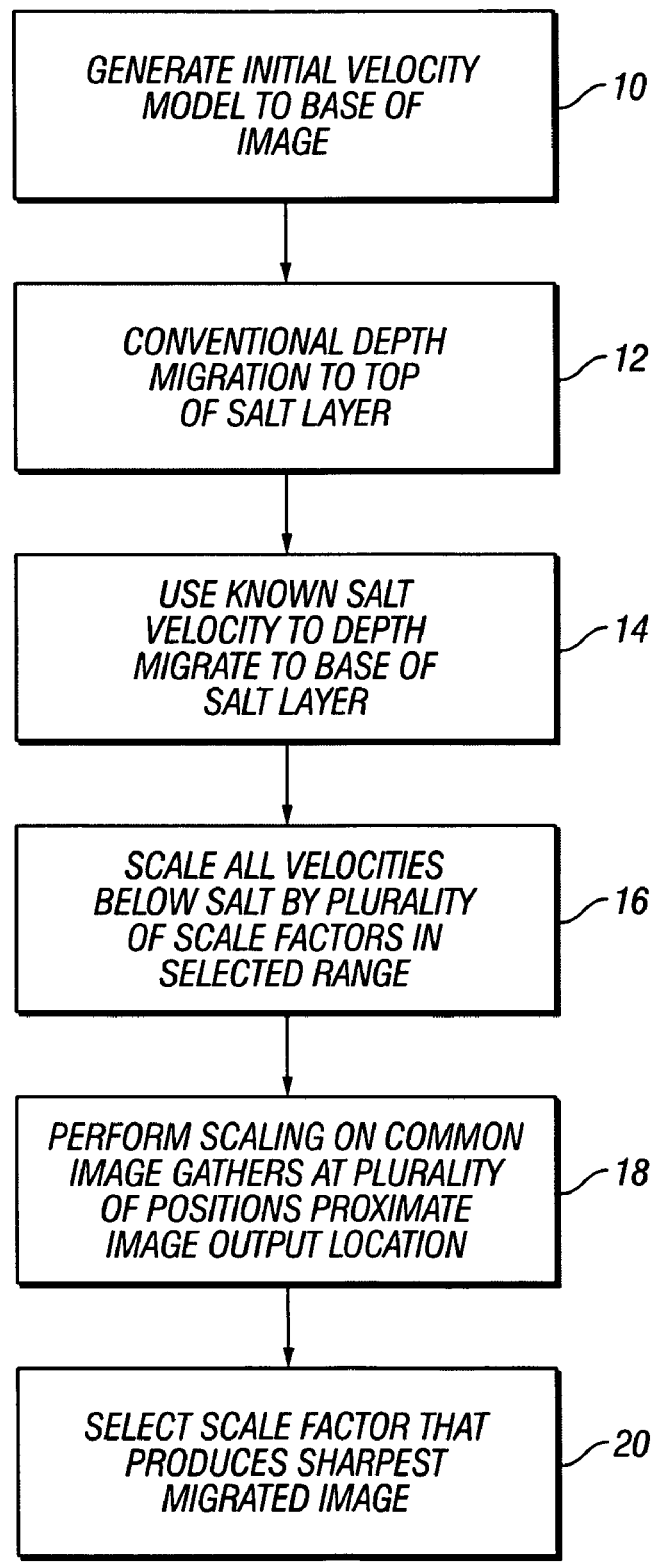
FIG. 1 shows a flow chart of one embodiment of a seismic data processing method according to the invention.

FIG. 1 shows a flow chart of one embodiment of a method according to the invention. At 10, an initial model of seismic velocity with respect to depth in the Earth is generated for one or more "image positions." An image position is a geographic position within the Earth for which a migrated seismic image is generated. Typically image positions are associated with some aspect of the geometry of acquisition of the seismic data processed according to the invention. Preferably the initial velocity model extends from the Earth's surface, or the water bottom for marine seismic data, to a selected depth in the Earth. The selected depth will be below what is interpreted from the seismic data as being a layer of salt in the subsurface Earth formations. Typically, the selected depth will be that to which a usable seismic image is believed to be determinable. The initial velocity model may be generated using any one of a number of seismic velocity analysis methods known in the art, and may include migration velocity analysis and reflection tomography inversion. Such methods are described, for example, in Deregowski, S. M., *Common-offset migrations and velocity analysis*, First Break, vol. 8, no. 6, pp. 224-234 (1990).

After the initial velocity model is generated, at 12, depth migration can be performed on the seismic data at the one or more image positions down to a depth interpreted from the seismic data as being the top of the salt layer. Preferably the depth migration includes residual velocity analysis to improve the estimates of seismic velocity with respect to depth for the Earth formations disposed above the salt layer. One form of residual velocity analysis is described in U.S. patent application Ser. No. 10/829,549 filed on Apr. 22, 2004, entitled, *Horizon-based Residual Depth Migration Velocity Analysis*, and assigned to an affiliate of the assignee of the present invention. By performing depth migration with residual velocity analysis as described, the depth in the Earth of the top of the salt layer may be reasonably precisely determined. The result of the depth migration process performed at 12 includes an updated velocity model that includes layer velocities and depths to the bottom of each such layer down to the top of the salt layer.

At 14, using a well known seismic velocity for the salt layer, a depth to the bottom of the salt layer may then be determined by selecting a reflection event in the seismic data that is interpreted as being the bottom of the salt layer, and calculating the depth from the reflection time to the bottom of the salt layer. The result of the foregoing procedures is a velocity model that is updated to the bottom of the salt layer.

Having updated the velocity model to a depth corresponding to the bottom of the salt layer, updating the velocity model for the formations below the salt layer will now be explained. The velocity model to this point includes the updated velocities down to the bottom of the salt layer, and the initially modeled velocities below the salt layer to the bottom of the image. Now, at each of the one or more image positions, shown at 16 in FIG. 1, the velocities in the model below the salt layer can then be scaled by a plurality of individual, constant, scale factors beginning at the bottom of the salt layer and extending to the bottom of the image. The scale factors are within a selected range about unity (the number one). The number of such scale factors and their range will depend on parameters such as the quality of the seismic data and geometry of acquisition of the seismic data, however it is contemplated that the range for the scale factors will typically be about 0.80 to 1.20, and more typically will be about 0.90 to 1.10. The increment between individual scale factors will likewise be related to seismic data parameters, however scale factor increments in a range of about 0.025 0.075 have provided useful results in performing the method of the invention. A result of the foregoing scaling will be a plurality of velocity models for the formations below the salt layer at each image position.

The foregoing procedure of generating an initial velocity model, performing depth migration using the model to the base of the salt, and scaling the velocity model below the bottom of the salt layer may then be repeated, at 18, for a plurality of common image gather positions, or image positions, that are geographically proximate to each of the one or more image positions selected for processing according to the present method. Preferably, such proximate image positions represent the geographically most proximate image positions as are consistent with the seismic data acquisition geometry (typically defined by the spacing between individual seismic sensors during acquisition). In one implementation, and referring to FIG. 2, the depth migrated images generated for each of the plurality of proximate image positions, and the associated selected image position, for each velocity scale factor, may be visually displayed in what may be referred to as a "mini-stack", at 22. A mini-stack can be displayed in an image "window", with the plurality of geographically proximate images associated with each scale factor displayed in each such window. The system operator may visually scan through the displayed windows, at 24, and for each scale factor determine, at 26, whether the associated image is an optimum. At 28, if the image is not optimum, the next scale factor window may be selected, and the foregoing evaluation may continue until an optimum image is determined.

Alternatively, selecting the optimum image may be performed other than using visual interpretation. For example, the foregoing plurality of images associated with each scale factor may be evaluated numerically for peak amplitude of reflective events below the salt layer, for frequency content, and for the number of image positions in which determined refractive events are interpreted to be present. The preferred scale factor may be associated with the maximum peak amplitude, the maximum frequency content, and the minimum number of image positions associated with refractive events. Qualitatively, such evaluation is said to produce the "sharpest" images below the salt layer. Visual interpretation of the optimum image may also be referred to as selecting the "sharpest" image.

The foregoing description explains how to determine one scale factor. It is within the scope of this invention that generating an optimum migrated image below a salt layer may include determining more than one scale factor. Depending on the particular formations and on the parameters relating to the acquisition of the seismic data, there may be one scale factor that is associated with each image event beneath the salt layer. In such cases, each scale factor may be determined by optimizing the image as explained above for each event below the salt layer. A result of such determination will thus include, for each selected image position, a set of scale factors associated with the various seismic events. The exact number of scale factors will depend on the seismic data being processed. It should be understood that the number of such scale factors in any implementation is not a limit on the scope of this invention.

Figure 2:
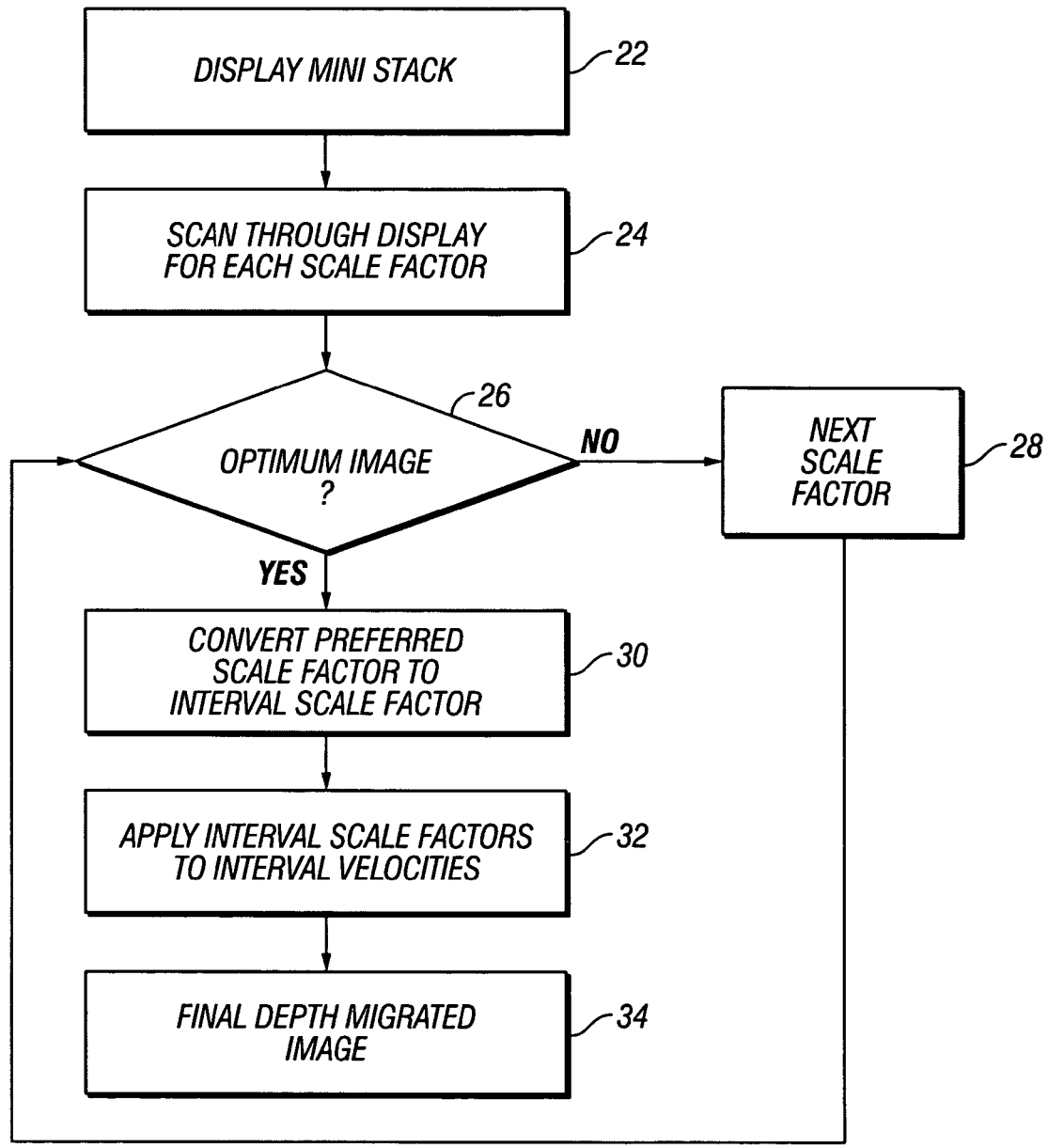
FIG. 2 shows a flow chart of one implementation of the method of FIG. 1 including visual interpretation of images.

Initially, each scale factor in the set, determined as explained above for one or more selected image positions, is treated as a scale factor of average velocity to the depth of each associated seismic event below the salt layer. No matter how the velocity is scaled, however, the two-way-travel time for a given reflective or diffractive event below the salt layer must remain unchanged, because the two-way travel time is determined from the seismic data. According to the foregoing rule, the following equation can be derived to convert the scale factor of average velocity to each event into a scale factor of interval velocity ($\gamma i$) to each successive event below the salt layer in the seismic data:

$$\gamma_i = \frac{\gamma_{a,i} z_i - \gamma_{a,i-1} z_{i-1}}{z_i - z_{i-1}} \quad (1)$$

where $z_i$ and $z_{i-1}$ represent depths on the migrated image to each (i-th) event, and $\gamma_{a,i}$ and $\gamma_{a,i-1}$ represent the scale factors determined for each event at depths $z_i$ and $z_{i-1}$, respectively. Referring once again to FIG. 2, converting scale factor of average velocity to scale factor of interval velocity is shown at 30. Because the foregoing equation can be used to calculate interval scale factors, the interval velocities can be updated directly from the interval scale factors by the expression:

$$V_{i,new} = \gamma_i \cdot V_{i,mig} \quad (2)$$

where $V_{i,mig}$ and $V_{i,new}$ represent interval velocities used to migrate and update velocity, and such is shown in FIG. 2 at 32. Index i begins at one from the bottom of the salt layer. An updated migrated depth for j-th event, represented by $Z_{j,new}$, can be determined by the expression:

$$Z_{j,new} = Z_{bot} + \sum_{i=1}^{j} \gamma_i \cdot (Z_i - Z_{i-1}) \quad (3)$$

where $Z_{bot}$ represents the migrated depth of the bottom of the salt layer, and such migration is shown in FIG. 2 at 34.

Figure 3:
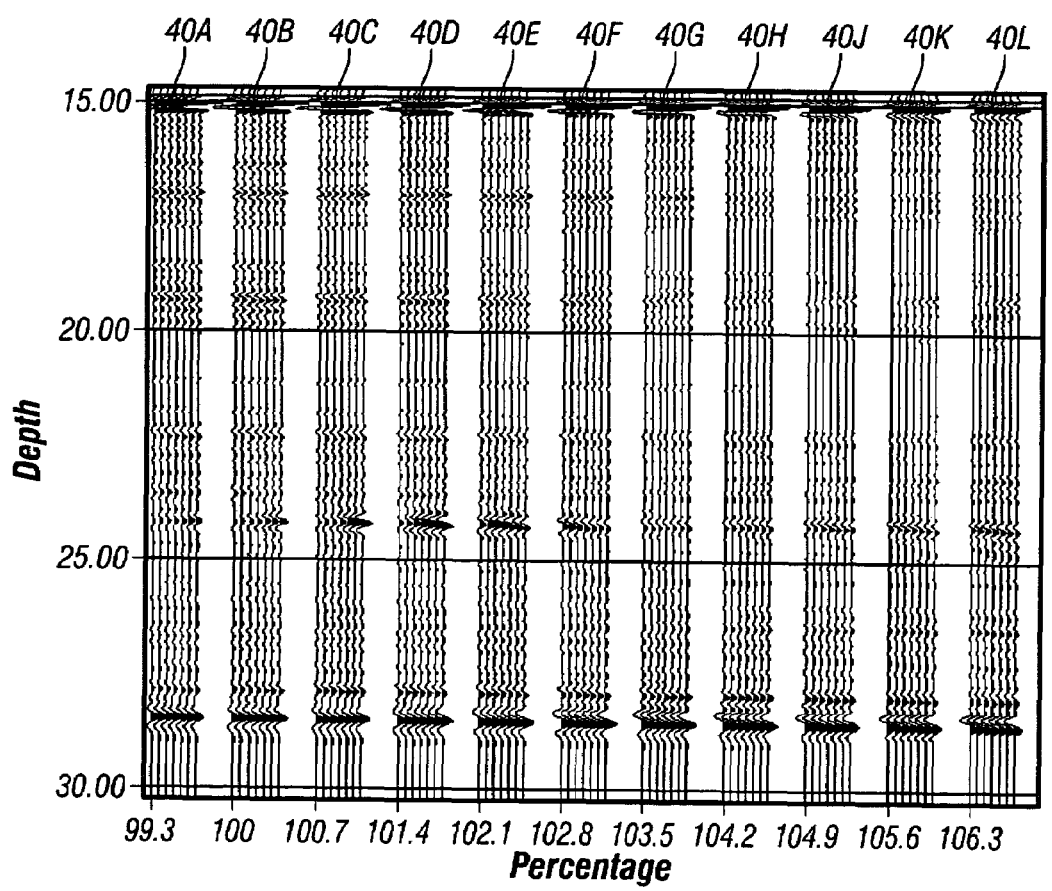
FIG. 3 shows an example of a visual display used with the implementation of FIG. 2.

An example of the visual display that can be used to select scale factor(s) is shown in FIG. 3. For each selected image position, a plurality of additional image positions are also selected proximate to the selected image position. A depth migrated, stacked image trace can be generated for each such selected image position and additional image positions. The foregoing image traces are collected into velocity scale factor "windows", shown at 40A through 40L in FIG. 3. Each window corresponds to one value of scale factor. The value of scale factor for each window may be displayed in a convenient location, which in the present embodiment is on the bottom of each window. Each one of a plurality of events may be evaluated in each window to determine, for each such event, the value of scale factor that provides the optimum image. The foregoing procedure may be repeated at any number of selected image positions within the available seismic data to generate enhanced images of the formations below the salt layer.

Figure 4:
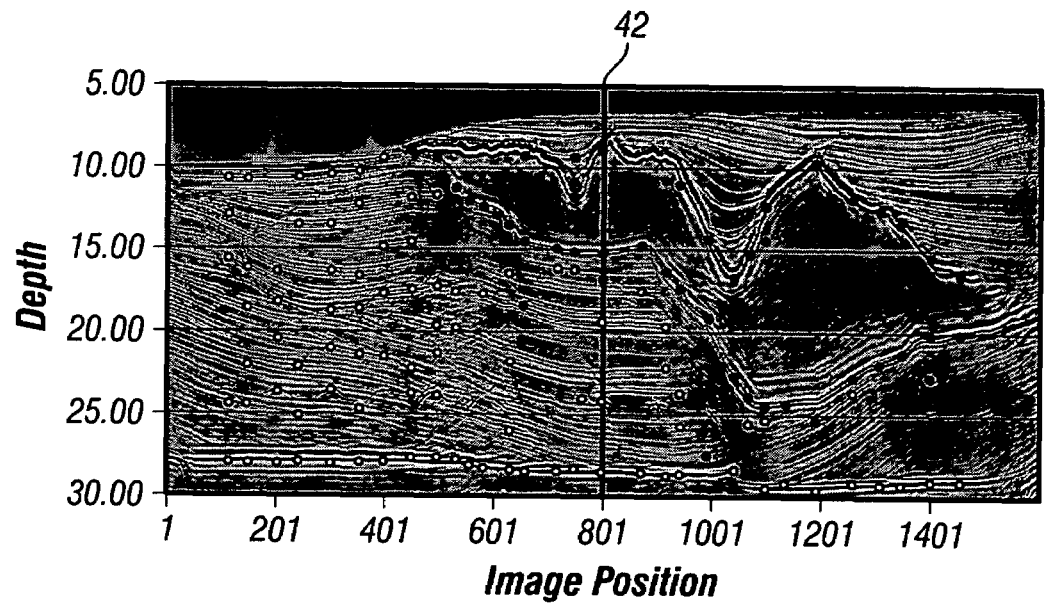
FIG. 4 shows a depth migrated section of synthetic seismic data using an initial velocity model.

FIG. 4 shows a depth migrated section of synthetic seismic data, using depth migration known in the art with only an initial velocity model. The line 42 represents a selected image position being analyzed using one of the foregoing embodiments, for which the scaling windows are displayed in FIG. 2. The initial velocity model was generated as explained above with reference to numeral 10 in FIG. 1, and does not include any of the velocity model updating explained above.

Figure 5:
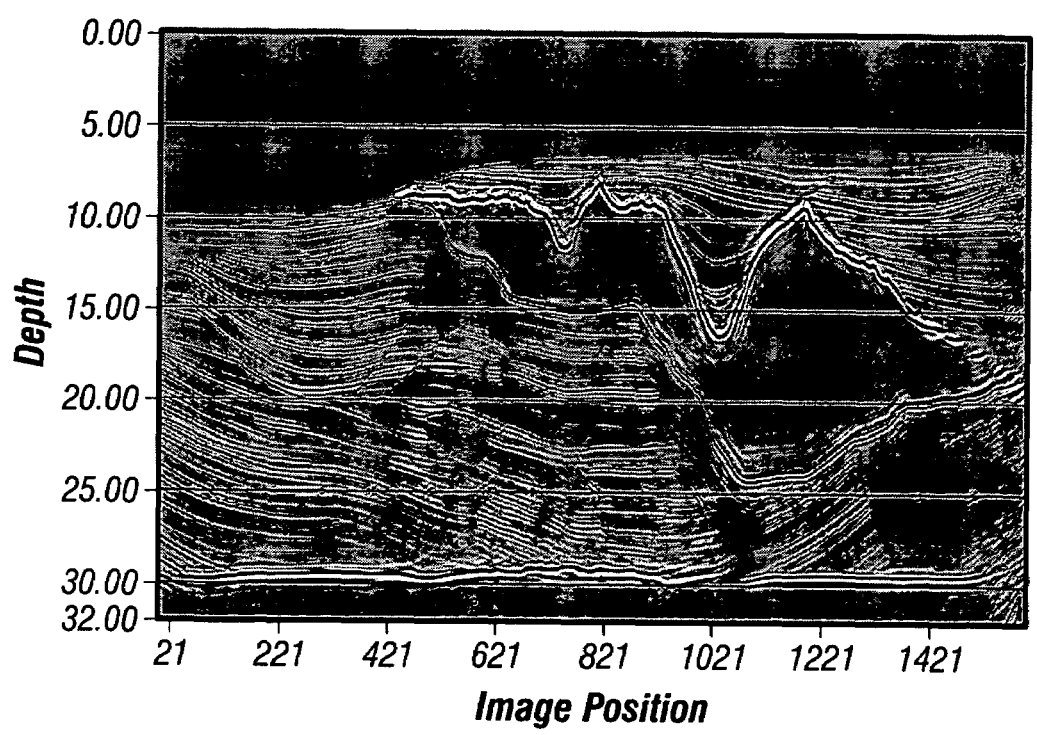
FIG. 5 shows the depth migrated section of FIG. 4 wherein the velocity model is updated using one embodiment of a method according to the invention.

FIG. 5 shows the depth migrated section of FIG. 4 wherein the velocity model is updated using one embodiment of a method according to the invention.

Figure 6:
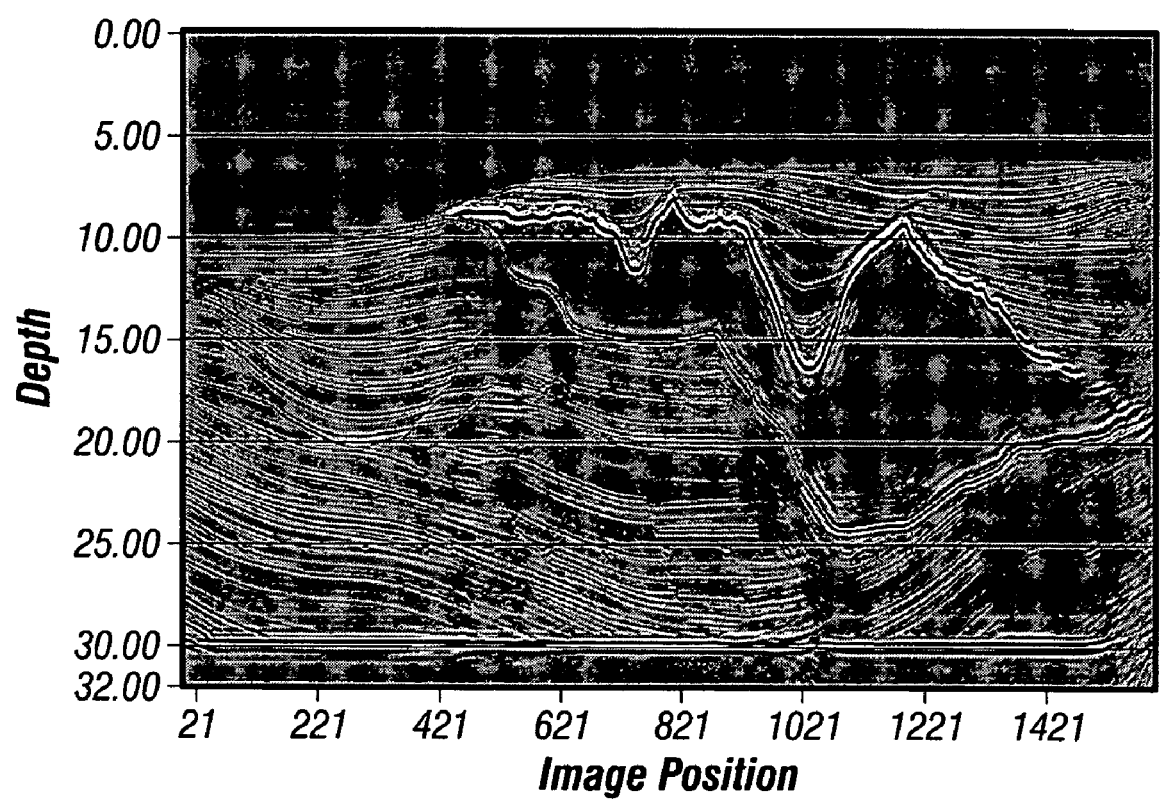
FIG. 6 shows the depth migrated section of FIG. 4 using the actual velocity values represented by the various formations in the subsurface.

FIG. 6 shows the depth migrated section of FIG. 4 using the actual velocity values represented by the various formations in the subsurface used to generate the synthetic seismic data. As can be observed in FIGS. 5 and 6, there is good agreement between the depth migrated section using the actual velocities and the depth migrated section using a velocity model updated as explained with reference to FIGS. 1 and 2 herein.

Figure 7:
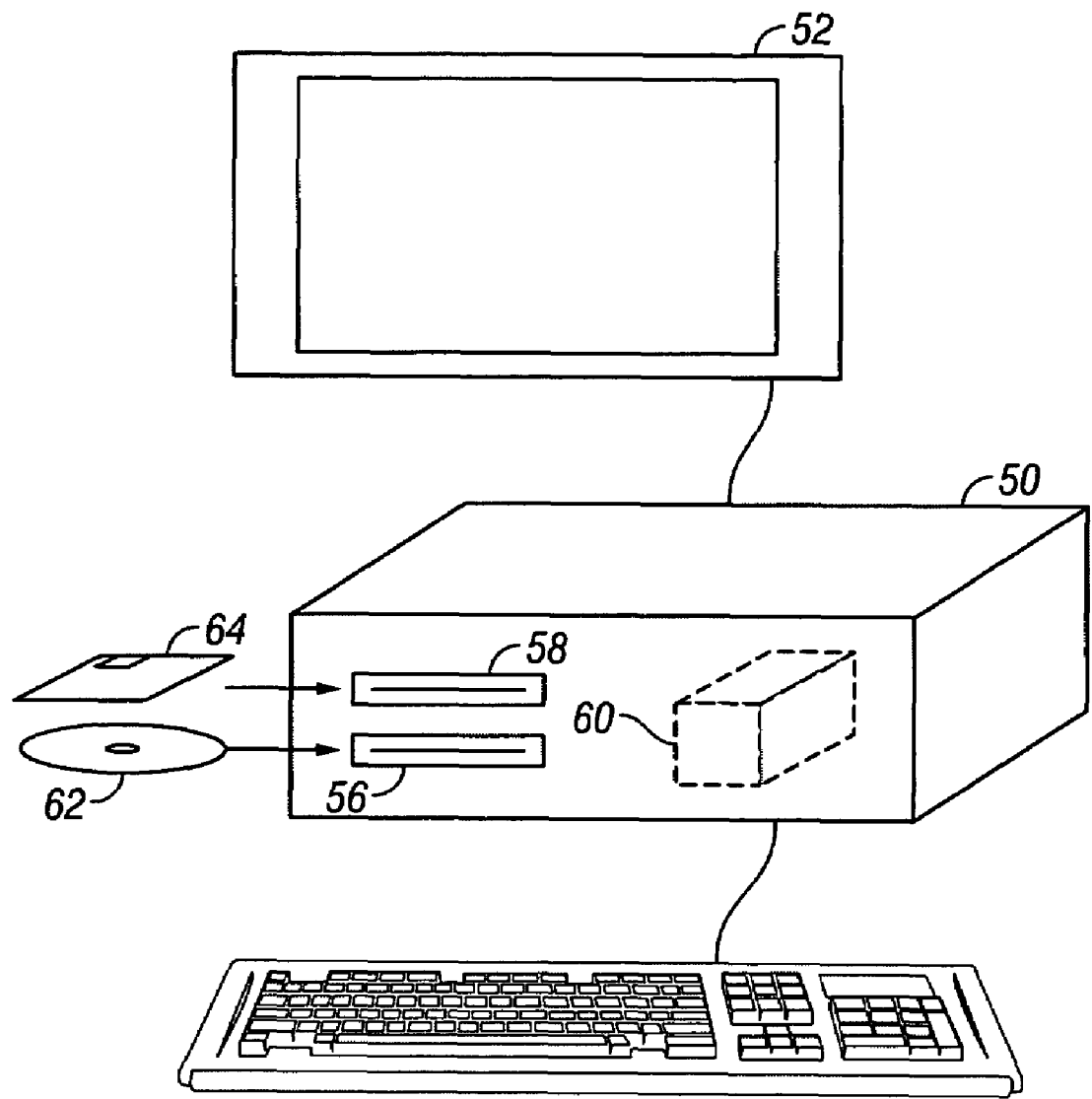
FIG. 7 shows a programmable computer having access to different types of computer readable storage media that can store a program according to another aspect of the invention.

In another aspect, the invention relates to computer programs stored in a computer readable medium. Referring to FIG. 7, the foregoing process as explained with reference to FIGS. 1 and 2 can be embodied in computer-readable code stored on a computer readable medium, such as floppy disk 68, CD-ROM 70 or magnetic hard drive 66 forming part of a general purpose programmable computer. The computer, as known in the art, includes a central processing unit 60, a user input device such as a keyboard 62 and a user display 64 such as a flat panel LCD display or cathode ray tube display. According to this aspect of the invention, the computer readable medium includes logic operable to cause the computer to execute steps as set forth above and explained with respect to FIGS. 1 and 2.

Methods and computer programs according to the invention may provide enhanced seismic images of the formations disposed below a salt layer while minimizing the computational burden associated with generating an accurate velocity model of the formations below a salt layer.

While the invention has been described with respect to a limited number of embodiments, those skilled in the art, having benefit of the foregoing disclosure, will appreciate that other embodiments can be devised which do not depart from the scope of the invention as disclosed herein. Accordingly, the scope of the invention should be limited only by the attached claims.

What is claimed is:

1. A method for generating an image of subsurface formations below a salt layer from seismic data acquired therefrom, the seismic data representing signals acquired by deploying a seismic energy source and seismic sensors, actuating the source and detecting seismic energy resulting therefrom at the sensors, comprising:
    depth migrating the seismic data to a bottom of the salt layer, the migrating including generating an initial model of velocities below the salt layer;
    scaling the initial model by a plurality of scale factors at at least one image position; and
    selecting at least one of the plurality of scale factors for which a depth migrated image below the salt layer is optimum to generate an optimized image at the at least one image position.

2. The method of claim 1 further comprising converting the selected scale factor to interval scale factors for each of a plurality of events in the seismic data below the salt layer.

3. The method of claim 1 wherein the optimum image is determined when a peak amplitude of at least one event in the seismic data below the salt layer is at a maximum.

4. The method of claim 1 wherein the optimum image is determined when a frequency content of at least one event in the seismic data below the salt layer is at a maximum.

5. The method of claim 1 wherein the optimum image is determined when an event interpreted as a diffractor is present in a minimum number of image positions proximate the at least one image position.

6. The method of claim 1 further comprising determining a scale factor associated with an optimum image for each of a plurality of events in the seismic data below the salt layer, and determining an interval scale factor associated with each event below the salt layer.

7. The method of claim 6 further comprising determining an interval velocity to each event below the salt layer and calculating a migration depth to each event below the salt layer using the interval velocity associated therewith.

8. The method of claim 1 further comprising:
    selecting a plurality of image positions proximate to the at least one image position;
    generating a visual display of images for the plurality of image position and the at least one image position; and
    determining the optimum image wherein a visual appearance of the images is sharpest.

9. A method for generating an image of subsurface formations below a salt layer from seismic data acquired therefrom, comprising:
    depth migrating the seismic data to a bottom of the salt layer, the migrating including generating an initial model of velocities below the salt layer, the seismic data representing signals acquired by deploying a seismic energy source and seismic sensors, actuating the source and detecting seismic energy resulting therefrom at the sensors;
    scaling the initial model by a plurality of scale factors at at least one image position;
    selecting at least one of the plurality of scale factors for which a depth migrated image below the salt layer is optimum;
    selecting a plurality of image positions proximate to the at least one image position;

generating a visual display of images for the plurality of image position and the at least one image position; and determining the optimum image wherein a visual appearance of the images is sharpest.

10. The method of claim 9 further comprising converting the selected scale factor to interval scale factors for each of a plurality of events in the seismic data below the salt layer.

11. The method of claim 9 wherein the optimum image is determined when a peak amplitude of at least one event in the seismic data below the salt layer is at a maximum.

12. The method of claim 9 wherein the optimum image is determined when a frequency content of at least one event in the seismic data below the salt layer is at a maximum.

13. The method of claim 9 wherein the optimum image is determined when an event interpreted as a diffractor is present in a minimum number of image positions proximate the at least one image position.

14. The method of claim 9 further comprising determining a scale factor associated with an optimum image for each of a plurality of events in the seismic data below the salt layer, and determining an interval scale factor associated with each event below the salt layer.

15. The method of claim 14 further comprising determining an interval velocity to each event below the salt layer and calculating a migration depth to each event below the salt layer using the interval velocity associated therewith.

* * * * *